United States Patent Office 3,558,699
Patented Jan. 26, 1971

3,558,699
2-AMINO-4-PHENYLSULFONYL-BENZENESULFONAMIDE
Jorgen A. Christensen, Virum, and Jorgen Buus Lassen, Glostrup, Denmark, assignors to A/S Ferrosan, Soborg, Denmark, a firm
No Drawing. Filed Oct. 29, 1968, Ser. No. 771,627
Claims priority, application Great Britain, Nov. 3, 1967, 50,141/67
Int. Cl. A61k *27/00;* C07c *143/80*
U.S. Cl. 260—556                    1 Claim

ABSTRACT OF THE DISCLOSURE 2-amino-4-phenylsulfonyl-benzenesulfonamide has a remarkable anticonvulsive effect, paired with absence of sedative effect. Its toxicity is low.

It is produced by Friedel-Crafts reaction between 4-chloro-3-nitrobenzenesulfonic-acid chloride and benzene, sulfidizing to form the disulfide compound, oxidation, amination and reduction of the nitro groups.

---

This invention relates to the hitherto unknown compound 2-amino-4-phenylsulfonyl-benzenesulfonamide having the formula

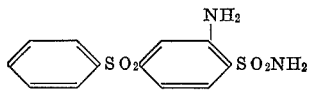

and therapeutical preparations therefrom and to methods for producing said substance.

Although several compounds derived from 2-amino-4-phenylsulfonyl-benzenesulfonamide are known, none of them have hitherto been found to possess properties of therapeutic interest.

It was therefore surprising to find that 2-amino-4-phenylsulfonyl-benzenesulfonamide, in the following referred to as F 399, has a remarkable anticonvulsive effect paired with absence of sedative effect. It produces a slight diuretic effect in mice and rats and a very low acute toxicity. In vitro as well as in vivo it shows carboanhydrase-inhibiting effect.

The promising properties of F 399 mentioned above have been compared with the known effects of phenemal

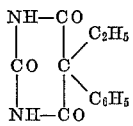

and phenatoin

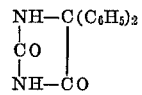

by experiments carried out with test animals in the following manner:

ANTICONVULSIVE EFFECT

White mice were clamped by electrode clamps in the skin of the neck and at the root of the tail. An electric current of 20 ma. and 100 v. was run through the body for 0.2 sec., whereby maximal electroshock convulsion with tonic spasms of the hind legs and the tail were induced in 100% of the control animals. The substance to be tested was orally administered in 6 mice for each dose tested. Electroshock was administered at a series of intervals beginning with the administration of the drug in question to ascertain the duration of its protective effect. $ED_{50}$ designates the dose (in mg. per kg. weight of the animal) which protects 50% of the animals against convulsions.

RESULTS

| | ½ hr. | 1 hr. | 2 hrs. | 4 hrs. | 7 hrs. | 18 hrs. | 24 hrs. | 48 hrs. |
|---|---|---|---|---|---|---|---|---|
| F 399, $ED_{50}$ | 35 | 8 | 10 | 17 | 18 | 50 | 100 | >20 |
| Phenemal, $ED_{50}$ | 30 | 10 | 14 | 14 | 20 | 20 | 43 | >100 |
| Phenantoin, $ED_{50}$ | 30 | 35 | 20 | 20 | 20 | 20 | 43 | 90 |

ACUTE TOXICITY

The medium lethal dose ($LD_{50}$) has been determined in mice and rats after oral administration with subsequent observation of the animals through 24 hours.

| | $LD_{50}$ in mice, mg./kg. | $LD_{50}$ in rats mg./kg. |
|---|---|---|
| F 399 | 2,000 | 2,000 |
| Phenemal | 350 | |
| Phenantoin | 1,000 | |

The absence of sedative effect and of barbituric acid potensing effect appears from the following table showing the effective dose in mg./kg. body weight in a series of experiments specified below and carried out for comparative purposes with the substances mentioned.

TABLE I

| | F 399 | Phenemal | Phenantoin | Acetazolamide | Sultiam | Cl-promazine |
|---|---|---|---|---|---|---|
| Test preparation: | | | | | | |
| A | >200 | 50 | 60 | >200 | >200 | 5 |
| B | [1]>200 | 195 | 156 | | 1140 | [2]1,8 |
| C | >400 | 50 | 175 | >200 | >200 | |
| D | >200 | >70 | 53 | | | 2 |

[1] Was 60 after administration.
[2] Was 30 minutes after administration.

(A) Barbiturate potension

The preparation to be tested was administered orally (to 6 animals, each dose) one hour before intravenous injection of enhexymal sodium salt in the amount of 50 mg./kg. body weight. This injection produced in nontreated control animals an anaesthetic state for a duration of 3–4 minutes. The effective sedative dose given in the table under A is the dose which prolongs the anaesthetic period to 4 times the period in the case of the controls.

(B) Spontaneous activity

A climbing test carried out in a cage provided with a ladder. When placing a group of 6 non-treated animals in the cage all animals would have climbed the ladder within a period of 10 minutes. The preparation to be tested was administered in 6 animals pro dose. The value given in the table is $ED_{50}$, i.e. the dose which inhibits 50% of the animals from climbing the ladder.

(C) Motoric coordination

Mice were placed on a rotating bar having a diameter of 4.5 cm. and moving one turn per minute. Untreated mice were able to stay on the bar for 1 minute without falling. The preparation to be tested was administered orally (6 mice each dose) and one hour after the administration the mice were placed on the bar. The value given in the table is the $ED_{50}$, i.e. the dose causing 50% of the animals to fall.

(D) Action on conditioned reflexions in rats

An apparatus consisting of a cage divided into two compartments by means of a wall in which there was an opening through which the animals could move from one compartment into the other ones.

Through the floor an electric shock could be injected to the animals. Immediately before applying the electric shock impulse (unconditioned impulse) a buzzing tone was sounded (conditioned impulse). Rats were trained to escape to the neighbouring compartment already when the tone was sounded (conditioned reflex). The preparation to be tested was applied perorally or subcutaneously in 10 rats per dose, and the conditioned reflex was tested at various intervals after administration. $ED_{50}$ in the above table means the dose in mg. per kg. body weight inhibiting the conditioned reflex in 50% of the animals when the test was carried out 2 hours after administration.

F 399 may be produced by a method illustrated by the following reaction scheme:

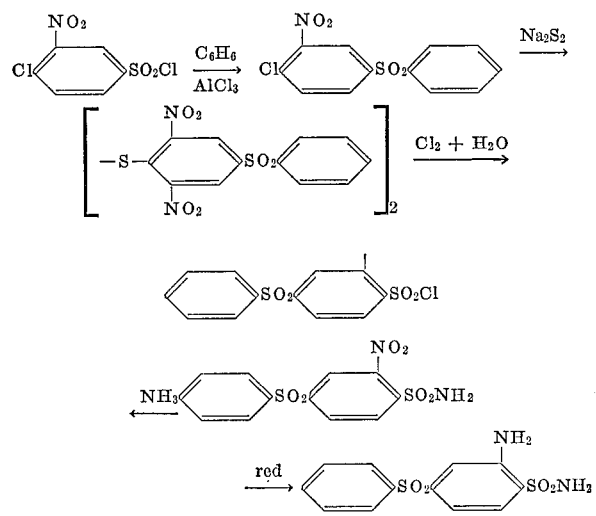

4-halo-3-nitrobenzenesulfonic acid chloride is dissolved in benzene, the solution is thoroughly dried and then treated with aluminum chloride. From the reaction product the 4-halo-3-nitrophenyl-phenylsulfone is isolated, dissolved in an aqueous solvent and sulfidized, preferably by using $Na_2S_2$ as sulfidizing agent. For this purpose a solvent, such as aqueous ethanol, in which the sodium sulfide can work is to be used. The bis-(2-nitro-4-phenylsulfonyl-phenyl)-disulfide is isolated by cooling and filtering. The isolated bis-compound is then oxidized. Oxidation of the disulfide can be carried out by chlorine in a concentrated medium, and the 2-nitro-4-phenyl-sulfonyl-benzenesulfochloride can be isolated by dilution with water and filtering. Amination and reduction of the nitro group is carried out in known manner. The halogen group in the 4-position may be chlorine or bromine.

In the following, the method described above is illustrated by way of an example, in which the melting point of F 399 and of the intermediates are given.

EXAMPLE 200 g. of the sodium salt of 4-chloro-3-nitrobenzenesulfonic acid and 200 g. of phosphorous pentachloride are mixed and then heated on the steam bath for 1 hour. After cooling the reaction mixture is poured out on 1 kg. of crushed ice, whereby a substance precipitated is isolated by filtration on a suction filter and washed with water. The substance isolated is the chloride of 4-chloro-3-nitrobenzenesulfonic acid which is dissolved in 800 ml. benzene. The solution is dried by means of potassium carbonate, after which 125 g. of waterfree aluminium chloride are added with stirring. The mixture is heated for 4 hours to 50–60° C. under continuous stirring, then cooled and poured out upon about 1.2 kg. of ice. In order to remove the benzene, the whole reaction mixture is subjected to distillation with steam, whereupon the product is cooled and the precipitate isolated by filtration. The substance obtained consists of 160 g. of 4-chloro-3-nitrophenyl-phenylsulfone with M.P. 131–132° C.

100 g. of the 4-chloro-3-nitrophenyl-phenylsulfone are dissolved in 1.5 litres of 96% ethanol and heated to boiling. While the boiling is continued under reflux, a solution of sodium disulfide is added, which solution is produced by mixing 60 g. of sodium sulfide, 280 ml. of 96% ethanol, 8 g. of sulphur and 80 ml. of water. Boiling is continued for 2 hours, whereupon the mixture is cooled; and a substance precipitated is removed by filtration on a suction filter and washed with water and dried. Hereby is obtained about 80 g. of bis-(2-nitro-4-phenylsulfonyl-phenyl)-disulfide with M.P. 246–248° C.

50 g. of this bis-(2-nitro-4-phenylsulfonyl-phenyl)-disulfide are suspended in 400 ml. of 95% acetic acid and gaseous chlorine is introduced for 4½ hours, the temperature being maintained at about 30° C. The reaction mixture is diluted with 2 litres of water, whereby a substance precipitates which is removed by filtration. The said substance consists in 65 g. of 2-nitro-4-phenylsulfonyl-benzene-sulfochloride with M.P. about 90° C.

The sulfochloride obtained is dissolved in 200 ml. of 1,2-dimethoxymethane and the solution obtained is added dropwise with agitation to 750 ml. of liquid ammonia, whereupon surplus of ammonia is allowed to evaporate. The last part of excess ammonia is removed on the steam bath. Now 500 ml. of water are added, and the mixture is acidified by means of 50 ml. of hydrochloric acid. Hereby about 55 g. of 2-nitro-4-phenylsulfonyl-benzene-sulfonamide are obtained having M.P. 176–182° C.

200 g. of iron powder, 500 ml. of water and 10 ml. of concentrated hydrochloric acid are heated with stirring of the steam bath for 15 minutes, whereupon 114 g. of 2-nitro-4-phenylsulfonyl-benzenesulfonamide are added in the course of 45 minutes. The mixture formed is heated for further 5 hours with agitation, whereupon 700 ml. of 8% sodium hydroxide solution are added and the heating is continued for still 15 minutes, whereupon the mixture is filtered. The precipitation is once more treated with 700 ml. of 8% sodium hydroxide solution for 15 minutes, followed by filtration. The filtrates are gathered and adjusted to pH 4 with acetic acid. The substance precipitated is isolated by filtration. Hereby about 95 g. of 2-amino-4-phenylsulfonyl-benzenesulfonamide are obtained. This substance is recrystallized from 50% ethanol. The recrystallized product consists of F 399 and has a M.P. of 191–192.5° C.

For therapeutic use this product may be mixed with pharmaceutically acceptable excipient to produce novel compositions, which preferably contain F 399 in predetermined concentration or in units of predetermined dosage.
What is claimed is:
1. 2-amino-4-phenyl-sulfonyl-benzenesulfonamide having the formula
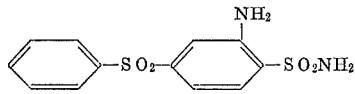
or a therapeutically acceptable salt thereof.
References Cited
UNITED STATES PATENTS
3,449,337   6/1969   Bell _____ 260—243
HENRY R. JILES, Primary Examiner
C. M. SHURKO, Assistant Examiner
U.S. Cl. X.R.
424—321